Feb. 6, 1934.   I. A. WEAVER   1,945,874
GYROSCOPIC VEHICLE STEERING STABILIZER
Filed April 17, 1933   2 Sheets-Sheet 1
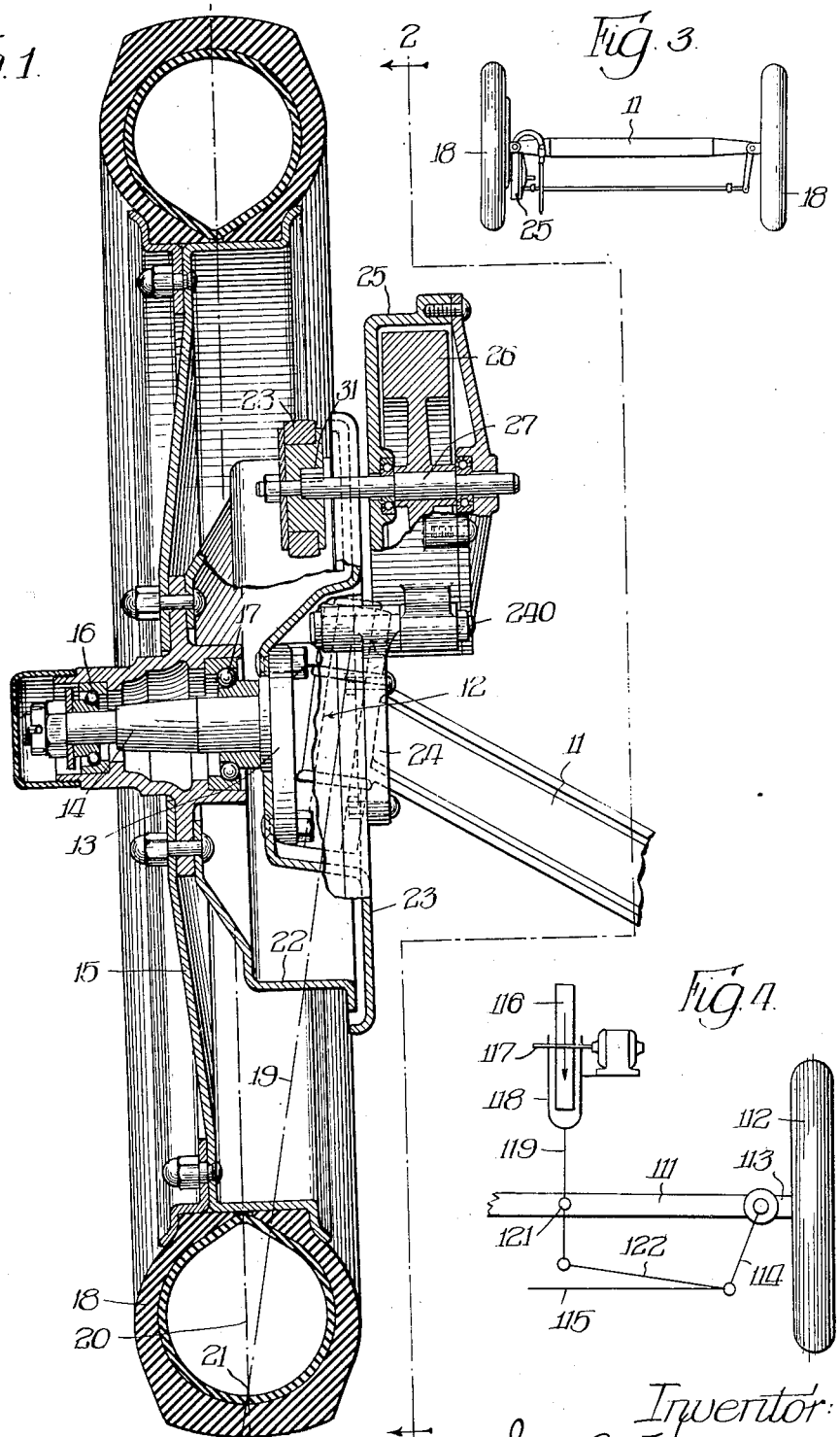
Inventor:
Ira A. Weaver
By Walter M. Fuller  Atty

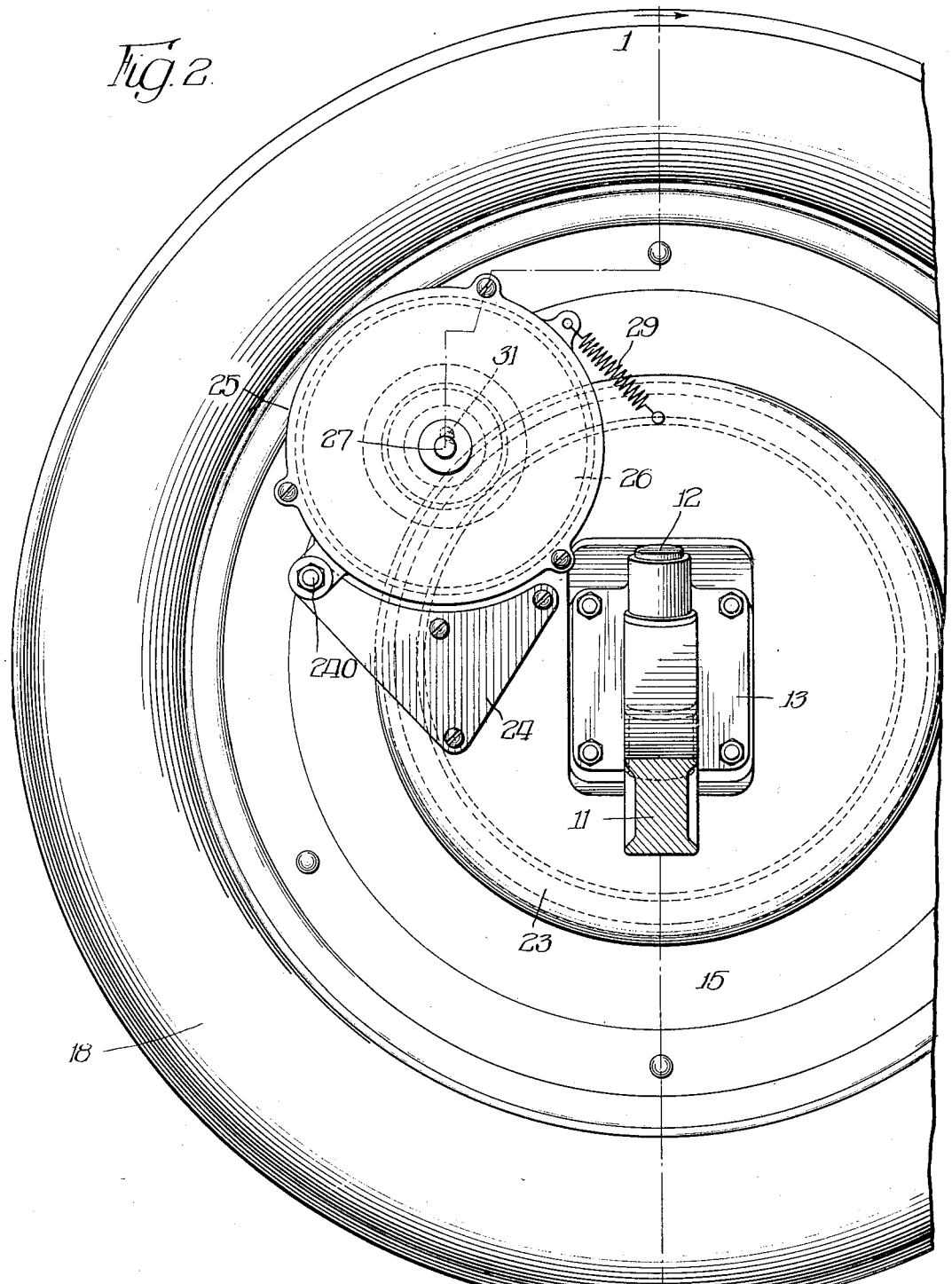

Patented Feb. 6, 1934

1,945,874

UNITED STATES PATENT OFFICE 1,945,874

GYROSCOPIC VEHICLE STEERING STABILIZER

Ira A. Weaver, Springfield, Ill.

Application April 17, 1933. Serial No. 666,432

10 Claims. (Cl. 280—95)

The well-known objectionable shimmy of the front steering road-wheels of an automobile is due to the gyroscopic reaction of such wheels when the front axle on which they are mounted oscillates about a horizontal axis lengthwise of the car, that is, when an end of such axle rises or descends.

Such vertical tilting of the axle on which the pair of front steering road-wheels of the vehicle are pivotally mounted may be occasioned when one of the wheels changes its elevation, as when passing over uneven road surfaces, or may be caused by unbalanced wheels.

Such effect is especially pronounced when the wheels are equipped with large, low-pressure pneumatic-tires, which are more readily compressed than those employing relatively-high air-pressures.

If the left-hand end of such front axle rises, the gyroscopic reaction of its pair of steering road-wheels causes the wheels to cut or turn to the right, thus suddenly changing the direction of car travel toward the right.

The centrifugal force of the spring-mounted, top-heavy body or load, however, tips such body to the left, thus forcing the left-hand end of the axle down and its right-hand end up, due to the resiliency or flexibility of the pneumatic-tires on which the axle and its wheels are mounted.

Such quick or rapid tilt of the axle in this reverse direction causes the rapidly-revolving road-wheels to cut to the left by reason of the gyroscopic reaction brought about by such tipping of the axle.

The load then swings to the right causing the wheels to turn to the right again, and this specified action is continuously repeated, setting up a violent oscillation of the wheels known to the trade as shimmy or wheel tramp.

It has been heretofore found that, if the king-pins, around which the steering-knuckles are adapted to turn during the wheel steering operation, are inclined downwardly outwardly, instead of being arranged exactly vertically, the steering stability is increased due to the fact that as the steering road-wheels and their supporting knuckles turn about such pins, the axle is elevated, and the weight of the car opposing such rise tends to hold the wheels in a straightforward direction.

It is also known that, if the axes of the king-pins intersect the ground on, or only slightly outside of, the center lines of contact of the tires on the ground lengthwise the vehicle, when either wheel engages an obstruction directly in front of the intersection of its king-pin axis with the ground, there is no tendency for the wheel to turn about the king-pin in either direction, thus eliminating or reducing any road shock on the wheel.

It has not been feasible heretofore to take advantage of such an arrangement of king-pins, due to the gyroscopic reaction of the road-wheels hereinbefore referred to, and, in an attempt to neutralize or offset such reaction, the king-pins have been arranged in the past to intersect the ground some distance at one side of the center line of tire-tread contact area with the ground.

One of the leading aims of the present invention is to provide means to neutralize or prevent the gyroscopic reaction of the steering road-wheels of an automobile or of trailer trucks, caused by the tilting of the front axle up and down, by other complementary gyroscopic means, thus not only avoiding the shimmy and tramp, but also allowing the king-pins to be located or inclined to the best advantage with intersection with the ground at, or slightly outside of, the center line of the tire-tread contact with the ground, thereby avoiding in substantial measure interference with the wheels when they engage road obstructions.

Stated somewhat differently, a substantial object of the invention is to provide a gyroscopic control means which will permit the axis of the king-pin around which the steering road-wheel turns when projected or prolonged to contact approximately with the horizontal center line of the tire-tread contact on the road surface; or, in other words, to supply a new combination of the king-pin inclination angle and the gyroscope control-mechanism, so that when one of the front steering road-wheels of the vehicle runs over an obstruction, causing a tilt of the axle, no material road shock will reach the steering-wheel.

In general, one of the prime purposes of the invention is to form a balanced steering control for the vehicle at any speed, and to prevent road shocks, shimmy, tramp, and tire-wear by reason of objectionable and detrimental oscillation of the steering road-wheels around their king-pins.

To enable those acquainted with this art to understand the invention, both from structural and functional standpoints, and to appreciate its several advantages, two present, preferred embodiments of the invention have been illustrated in the accompanying drawings forming a part of this specification and to which reference should be had in connection with the following detailed description, like reference numerals having been employed throughout the several views to designate the same parts.

In these drawings:

Figure 1 is a vertical section through one of the front steering road-wheels of an automobile showing the same equipped with my novel and improved gyroscopic governing mechanism;

Figure 2 is a fragmentary elevation of the inner side of the wheel showing a portion of the axle;

Figure 3 is a partial plan view of the steering mechanism of an automobile equipped with the new invention; and Figure 4 is a modified embodiment of the invention illustrating the same diagrammatically in considerable measure.

Referring first to the embodiment of the invention depicted in Figures 1, 2, and 3, it may be remarked that both ends of the front axle 11 of the vehicle are equipped with steering wheels like the single one shown in the figures, except that the one not illustrated need not necessarily be equipped with a gyroscopic mechanism described hereinafter.

A description of that portion of the construction shown in Figure 1 will therefore suffice for the wheel structure at the other end of the axle.

The axle 11 has a suitably-supported, inclined king-pin 12, and mounted to turn on such king-pin is the usual steering-knuckle 13 having the customary outstanding spindle 14 on which the vehicle-wheel 15 is adapted to revolve on appropriate ball-bearings 16, 17, the wheel being equipped with a pneumatic rubber tire 18, all of which in general is the present standard construction.

The king-pin is so inclined, however, that its axis 19 when extended to intersect the ground will be at, or slightly outside of, the longitudinal center-line of the tire-tread contact area of the ground.

As is shown in Figure 1, this king-pin axis 19 intersects the center plane 20 of the tire at a point 21 slightly above the tread of the tire, so that when the tire becomes slightly flattened in passing over an obstruction, such point, or king-pin axis intersection with the central plane of the tire, will be practically at the then somewhat depressed surface of the tire tread in order to gain the advantage of avoidance of shock and ease of steering referred to above.

Such an arrangement of parts, however, would not be entirely practicable were it not for the use of the gyroscopic counterbalancing mechanism about to be described.

The brake-drum 22 of the wheel, which of course revolves with the wheel, is fitted with the customary stationary brake-shield 23 carried by the steering-knuckle.

On this shield a bracket 24 is fixedly mounted in any approved or convenient manner, and on a hinge-pin 240 supported by such brake-shield a casing 25 is rockingly mounted, such casing housing a gyroscope-wheel 26 on a rotary-shaft 27, a protruding portion of which extends over the brake-shield, its outer part having a friction drive-wheel 28 adapted to contact and to roll on the exterior surface of the brake-drum 22 and to be revolved thereby.

A coiled contractile spring 29, fastened at one end to the gyroscope-wheel casing 25 and secured at its other end to the stationary brake-shield 23, assures a proper driving contact of the wheel 28 with the outer cylindrical surface of the drum at all times.

In order that the steering road-wheel 15 may be braked and stopped suddenly when occasion requires, as in emergencies, without coincidentally terminating the rotation of the gyroscope-wheel 26, the drive-wheel 28, instead of being directly keyed to the shaft 27, is operatively united thereto through an overrunning ball-clutch 31 of any convenient design or structure.

The specified driving means for the gyroscope-wheel 26 revolves such member in a direction the opposite of that of the associated steering road-wheel 15 and at a materially higher speed, whereby the gyroscopic reaction of the steering road-wheel is neutralized by the reaction of the wheel 26, it being clear that whenever the road-wheel is turned about the king-pin axis, as in steering, the gyroscope-wheel is simultaneously turned, thus permitting the gyroscope-wheel to directly affect the action of the road-wheel.

Such gyroscope-wheel may be mounted on only one of the steering road-wheels or one may be associated with each of such wheels, if preferred.

It will be readily understood that any tilting action of the axle causes the road-wheels and the gyroscope-wheel to tip correspondingly, and inasmuch as the gyroscope-wheel is revolving in the opposite direction to that of the road-wheels, it will counteract any gyroscopic reaction of such wheels.

It is not necessary that the gyroscope-wheel have sufficient energy to overcome all of the gyroscopic reaction of the two front steering road-wheels, as the friction of the wheel-pivots and of the various connections, and the natural, inherent steering stability due to the inclination of the king-pins, all tend to dampen out the gyroscopic effect of the road-wheels.

It is therefore sufficient for the gyroscope-wheel to have sufficient energy to check or neutralize these forces before they have a chance to build up into higher amplitudes.

Furthermore, it is not essential that the gyroscope-wheel be mounted on the spindle of the steering road-wheel as illustrated, nor is it necessary that the axis of the gyroscope-wheel be parallel to the axis of the spindle, it being merely requisite that the plane of the gyroscope-wheel turn simultaneously with the plane of the road-wheel, but even these two planes need not be parallel.

Accordingly, in Figure 4 I have shown another arrangement diagrammatically.

In this embodiment, the axle 111 has the steering road-wheels mounted thereon in the usual way, the right front wheel 112 only being shown as revolving on the spindle of the steering-knuckle 113 which is equipped with an arm 114 joined to the steering-rod 115.

The gyroscope-wheel 116, which may be driven by an electric-motor in any approved manner is mounted on a horizontal shaft 117, supported in a yoke 118 at the end of a lever-arm 119 fulcrumed on the axle at 121, the rear or other end of such arm 119 being connected by a link 122 to the spindle-arm, as shown.

From the foregoing it will be clear that whenever the steering road-wheels are turned, the plane of the gyroscope-wheel will be similarly rocked, so that the gyroscopic reaction of the road-wheels is neutralized or counterbalanced by the reaction of the oppositely-revolving gyroscope-wheel.

In the form of structure shown in Figures 1, 2, and 3, the speed of rotation of the gyroscope-wheel is proportional to that of the road-wheels, but in the embodiment of Figure 3, if the gyroscope-wheel is revolved by an electric-motor from the battery at a uniform speed, it would of course not be proportional always to the speed of rotation of the ground wheels; but, in many instances, the effect of the gyroscope-wheel would be sufficiently correct to adequately offset the gyroscopic reaction of the road-wheels.

Stated somewhat differently, in this second embodiment the gyroscope-wheel is pivotally mounted on the front axle of the automobile for precession around its vertical pivot.

It will be observed that the axis of the gyroscope-wheel is horizontal or parallel to the automobile axle, so that any tilt of the latter causes the gyroscope-wheel to precess, and this counteracting action is transmitted through the lever-arm to the steering-mechanism and to the road-wheels.

By attaching the gyroscope-wheel to the road-wheel spindle-assemblage direct, or to the back plate as shown in Figures 1 and 2, which is the preferred construction, the precession then takes place around the king-pin, which is usually inclined in the modern car instead of being vertical or at right angles to the axis, but this inclination does not materially reduce the precessional force of the gyroscope.

The invention as defined by the appended claims is not limited or restricted to the particular embodiment shown and described, and more or less changes may be incorporated therein without departure from the principles of the invention and without the loss of any of its material advantages.

I claim:

1. In a vehicle having a turnable steering road-wheel, means to turn said wheel to steer the vehicle, a gyroscope-wheel, means mounting said gyroscope-wheel to turn simultaneously with the steering turning of said road-wheel, and means to revolve said gyroscope-wheel in a direction whereby the tendency of the gyroscope-wheel to precess opposes the tendency of the steering road-wheel to precess.

2. In a vehicle, the combination of an axle, spindles rockingly mounted on the opposite ends of said axle for steering, road-wheels revoluble on said spindles, means to turn said spindles to steer the vehicle, a gyroscope-wheel, means mounting said gyroscope-wheel to turn simultaneously with the steering turning of said road-wheels, and means to revolve said gyroscope-wheel in a direction whereby the tendency of the gyroscope-wheel to precess opposes the tendency of the road-wheels to precess.

3. In a vehicle, the combination of an axle, spindles rockingly mounted on the opposite ends of said axle for steering, road-wheels revoluble on said spindles, means to turn said spindles to steer the vehicle, a gyroscope-wheel, means mounting said gyroscope-wheel substantially parallel to said road-wheels and to turn simultaneously with the steering turning of said road-wheels, and means to revolve said gyroscope-wheel in the direction the opposite of the direction of rotation of said road-wheels, whereby the tendency of said gyroscope-wheel to precess opposes the tendency of the road-wheels to precess.

4. In a vehicle, the combination of an axle, spindles rockingly mounted on the opposite ends of said axle for steering, road-wheels revoluble on said spindles, means to turn said spindles to steer the vehicle, a gyroscope-wheel, means mounting said gyroscope-wheel to turn simultaneously with the steering turning of said road-wheels, and means to revolve said gyroscope-wheel at a speed proportional to and faster than the speed of rotation of said road-wheels and in a direction whereby its tendency to precess opposes that of said road-wheels.

5. In a vehicle, the combination of an axle, spindles rockingly mounted on the opposite ends of said axle for steering, road-wheels revoluble on said spindles, means to turn said spindles to steer the vehicle, a gyroscope-wheel, means mounting said gyroscope-wheel on one of said spindles, and means to revolve said gyroscope-wheel in a direction whereby the tendency of said gyroscope-wheel to precess opposes the tendency of said road-wheels to precess.

6. In a vehicle, the combination of an axle, spindles rockingly mounted on the opposite ends of said axle for steering, road-wheels revoluble on said spindles, means to turn said spindles to steer the vehicle, a gyroscope-wheel, means mounting said gyroscope-wheel on one of said spindles, and means to rotate said gyroscope-wheel by the adjacent one of said road-wheels in a direction whereby the tendency of said gyroscope-wheel to precess opposes the tendency of said road-wheels to precess.

7. In a vehicle, the combination of an axle, steering-knuckles rockingly mounted on the opposite ends of said axle for steering, road-wheels revoluble on said knuckles, means to turn said knuckles to steer the vehicle, a gyroscope-wheel, means mounting said gyroscope-wheel on the steering-knuckle of one of said road-wheels, a brake-drum for said road-wheel on that knuckle equipped with said gyroscope-wheel, and means frictionally engaging said brake-drum to revolve said gyroscope-wheel in a direction whereby the tendency of said gyroscope-wheel to precess opposes the tendency of said road-wheels to precess.

8. In a vehicle, the combination of an axle, steering-knuckles mounted on the opposite ends of said axle, road-wheels revoluble on said knuckles, means to turn said knuckles to steer the vehicle, a gyroscope-wheel, means mounting said gyroscope-wheel on one of said knuckles, means to revolve said gyroscope-wheel by the rotation of the road-wheel on the knuckle on which said gyroscope-wheel is mounted, and an overrunning-clutch in said gyroscope-wheel revolving-means, whereby said gyroscope-wheel may continue rotation after the speed of rotation of said road-wheel has decreased and at a speed higher than said wheel speed, the tendency of the gyroscope-wheel to precess opposing the tendency of said road-wheels to precess.

9. In a vehicle, the combination of an axle, a downwardly outwardly inclined king-pin on said axle, a steering-knuckle rockable about the axis of said king-pin, a tire-equipped road-wheel revoluble on said knuckle, the axis of said king-pin intersecting the central plane of the wheel tire slightly above the tread surface of the tire, means to turn said knuckle, a gyroscope-wheel, means mounting said gyroscope-wheel to turn simultaneously with the steering turning of said road-wheel, and means to revolve said gyroscope-wheel in a direction whereby the tendency of the gyroscope-wheel to precess opposes the tendency of said road-wheel to precess.

10. In a vehicle, the combination of an axle, a downwardly outwardly inclined king-pin on said axle, a steering-knuckle rockable about the axis of said king-pin, a tire-equipped road-wheel revoluble on said knuckle, the axis of said king-pin intersecting the central plane of the wheel tire slightly above the tread surface of the tire, means to turn said knuckle, a gyroscope-wheel mounted to revolve on said knuckle, whereby the gyroscope-wheel turns simultaneously with the steering turning of said road-wheel, and means to transmit the rotation of said road-wheel to said gyroscope-wheel, the direction of rotation of the gyroscope-wheel being such that the tendency of the gyroscope-wheel to preces opposes the tendency of said road-wheel to precess.

IRA A. WEAVER.